United States Patent

Keller

[11] Patent Number: 5,292,034
[45] Date of Patent: Mar. 8, 1994

[54] METHOD FOR THE PRODUCTION OF A TUBE WITH A MULTI-LAYER TUBE HEAD AND A TUBE MADE OF A PIPE ELEMENT HAVING AT LEAST ONE PLASTIC LAYER AND A MULTI-LAYER TUBE HEAD

[75] Inventor: Gerhard Keller, Jongny, Switzerland

[73] Assignee: AISA Automation Industrielle SA, Vouvry, Switzerland

[21] Appl. No.: 777,273

[22] PCT Filed: Mar. 26, 1991

[86] PCT No.: PCT/EP91/00580
§ 371 Date: Nov. 25, 1991
§ 102(e) Date: Nov. 25, 1991

[87] PCT Pub. No.: WO91/15350
PCT Pub. Date: Oct. 17, 1991

[30] Foreign Application Priority Data
Mar. 26, 1990 [DE] Fed. Rep. of Germany ....... 4009656

[51] Int. Cl.⁵ .................... B29D 23/20; B29C 43/18; B65D 35/10; B65D 35/12
[52] U.S. Cl. .................... 222/107; 264/259; 264/263; 264/279
[58] Field of Search ............... 222/107; 264/259, 263, 264/268, 279

[56] References Cited

U.S. PATENT DOCUMENTS

| | | | |
|---|---|---|---|
| 3,465,917 | 9/1969 | Saeki | 222/107 |
| 4,132,331 | 1/1979 | Mägerle | 222/107 |
| 4,338,278 | 7/1982 | Schultz | 264/261 |
| 4,548,338 | 10/1985 | Sander | 222/107 |
| 4,568,001 | 2/1986 | Sander | 222/107 |
| 4,784,920 | 11/1988 | Machida | 264/259 X |

FOREIGN PATENT DOCUMENTS

| | | |
|---|---|---|
| 0059281 | 9/1982 | European Pat. Off. . |
| 3215171 | 11/1982 | Fed. Rep. of Germany . |
| 2322058 | 3/1977 | France . |
| 2191167 | 12/1982 | United Kingdom . |

OTHER PUBLICATIONS

Patent Abstracts of Japan, vol. 4, No. 88, Document No. 55-46949, Apr. 1980.

*Primary Examiner*—Andres Kashnikow
*Assistant Examiner*—Anthoula Pomrening
*Attorney, Agent, or Firm*—Collard & Roe

[57] ABSTRACT

The invention relates to a method for the production of tubes from a prefinished pipe element, by pressing of heated plastic blanks to form a multi-layer tube head, with simultaneous bonding of the tube head to the pipe element. According to the invention, each layer of the multi-layer tube head is produced individually, by pressing of a newly introduced plastic blank in each case, where the next blank for the subsequent layer is not introduced and pressed until after the layer previously produced is stable in shape. The invention also relates to a tube made of a pipe element (1) having at least one plastic layer, and a multi-layer tube head (2) molded on by pressing heated plastic blanks, with a neck part (8) opening out centrally in a dispensing opening (9) with an outside thread (11) to screw on a closure cap, where according to the invention, each layer (3, 6, 5) of the multi-layer tube head (2) is pressed in individually, layer by layer, onto the upper end of the pipe element (1).

10 Claims, 1 Drawing Sheet

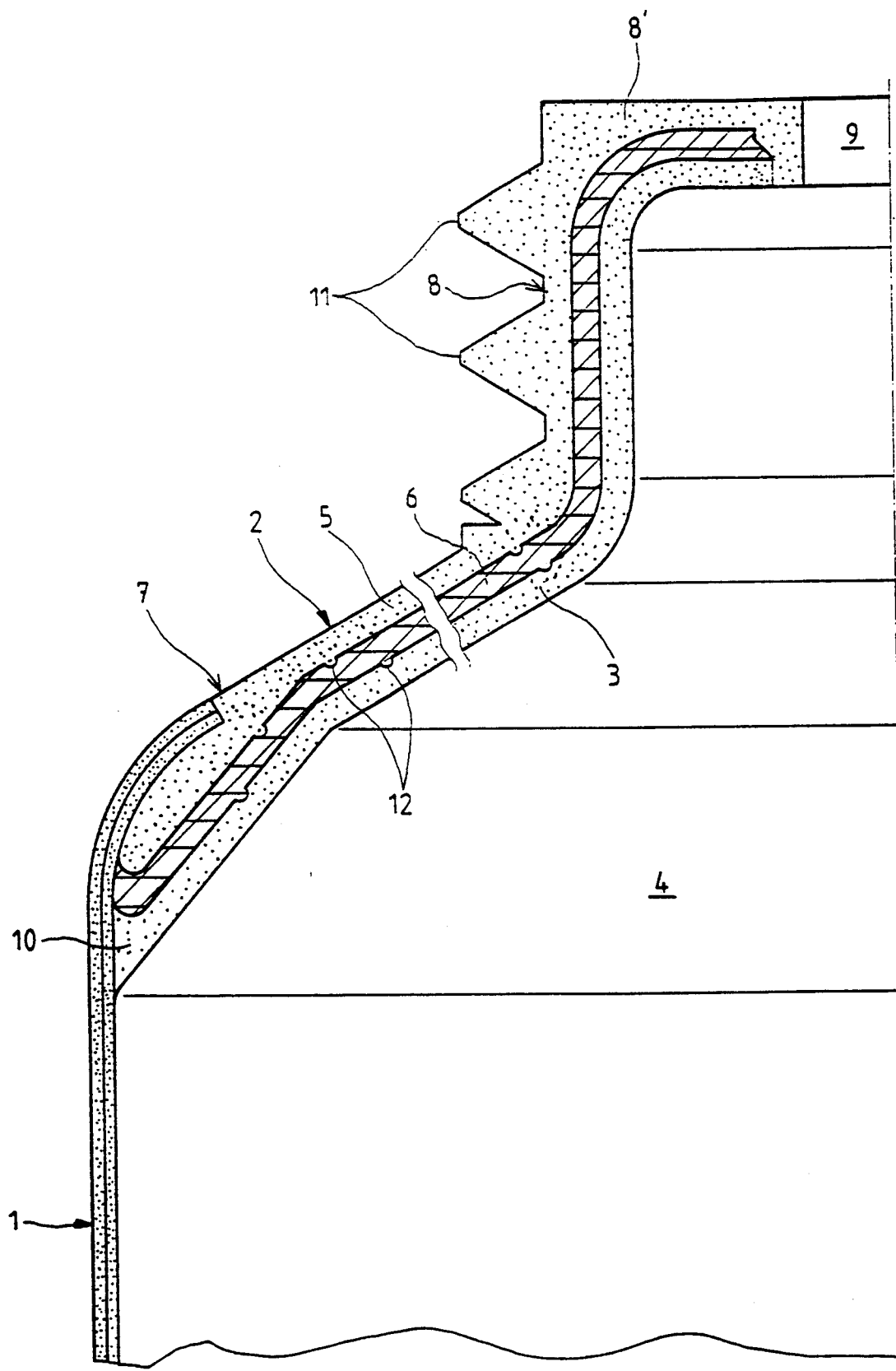

METHOD FOR THE PRODUCTION OF A TUBE WITH A MULTI-LAYER TUBE HEAD AND A TUBE MADE OF A PIPE ELEMENT HAVING AT LEAST ONE PLASTIC LAYER AND A MULTI-LAYER TUBE HEAD

BACKGROUND OF THE INVENTION

1. Field of the Invention

The invention relates to a method for the production of a tube made of a pipe element having at least one plastic layer and a multi-layer tube head molded by pressing of heated plastic blanks, with a tube neck opening out centrally in a dispensing opening, and with an outside thread to screw on a closure cap.

2. The Prior Art

Such a method and such a tube are known from EP-A-59281. The tube is produced in that two plastic blanks are issued above one another from two nozzle openings arranged above one another, and jointly brought to a press mold. The press mold consists of a mandrel, the free end of which reproduces the inside shape of the tube head, onto which a pre-finished pipe element is placed, and a die which reproduces the outside shape of the tube head. By applying pressure, the blanks are pressed to produce a layered tube head, which is simultaneously bonded to the pipe element. It is true that two layers can be obtained in this way, but they do not have a uniform arrangement, since even with slight variations in the viscosity or the temperature of the blanks, different flow velocities occur, which result in different distribution of the two blanks in the press mold. Therefore only tubes with two layers in the tube head can be produced. However, there is also a need to produce a tube with three layers, for example, one of which is supposed to be a barrier layer. Plastics with a barrier effect are usually difficult to combine with other plastics, and/or are not allowed to come into contact with the contents of the tube, so that additional covering layers are required as covering and/or insulating layers.

SUMMARY OF THE INVENTION

It is an object of the invention to provide a method of the type stated initially, which allows the production of multi-layer tube heads, particularly including more than two layers, with a defined structure of the individual layers, in simple manner.

It is also an object of the invention to provide a tube of the type stated initially, the tube head of which demonstrates layers with a desired reproducible shape, where each tube head can also consist of more than two layers and of different material in each case, including a barrier material. These objects are achieved by the method according to the invention; and by the tube according to the invention.

BRIEF DESCRIPTION OF THE DRAWINGS

In the following, the invention will be described on the basis of an embodiment of a tube, with reference to a drawing which shows a cross-section through half a tube head with the adjacent pipe element.

DETAILED DESCRIPTION OF THE PREFERRED EMBODIMENT

The tube has a pipe element 1, which consists of two plastic layers connected with one another, for example of a polyethylene, in the embodiment. The pipe element 1 can consist of two hoses extruded into one another, for example. It can also be produced from a film material which is welded together along the longitudinal edges. The pipe element can also have a different structure, for example only one layer or more than two layers, one of which can also be a barrier layer of plastic, or, for example, also of aluminum.

The tube head 2 has three layers in the embodiment, and has an inside layer 3 directed towards the inside of the tube, the outside surface of which limits the interior 4 of the tube, an outside layer 5, the surface of which determines the outside shape of the tube head 2, as well as a middle layer 6 arranged between them. All three layers together form a conical base part 7 of the tube head 2 and a cylindrical neck part 8, and the cover 8' in which a centrally arranged dispensing opening 9 is contained. The dispensing opening 9 can also correspond to the inside diameter of the neck part 8 (not shown).

In the embodiment, the middle layer 6 is retracted slightly relative to the inside layer 3 and somewhat more relative to the outside layer 5 in the cover 8', so that in this area, the inside layer 3 is directly connected with the outside layer 5, and the middle layer 6 is encapsulated on the end there, so that it cannot come into contact with the tube contents.

It is advantageous if the inside layer 3 has a widened foot 10 at its end which rests against the inside wall of the pipe element 1, which significantly enlarges the connection surface of the inside layer 3 with the pipe element 1 and therefore guarantees a better and more durable bond, which is resistant even to high pressures. The widened foot has a cross-sectional dimension greater than the cross-sectional dimension of the rest of the inside layer. In the embodiment, the middle layer 6 is bent away at its end adjacent the pipe element 1 in such a way that it is directed at an angle of 90°±20° towards the inside pipe wall, and thus guarantees an optimum seal with regard to the pipe element 1. The middle layer 6 can abut directly and at an almost perpendicular angle against the inside wall of the pipe element 1 at the outside edge, as shown. In other cases, however, it can also be retracted somewhat and/or not be angled (not shown), so that the outside layer 5 can be directly connected with the inside layer 3 also at this end, which makes it possible to encapsulate the middle layer 6 here, too. The angled end position of the middle layer 6 also allows a significant widening of the foot 10, without this foot having to project particularly deeply into the interior 4 of the tube.

Starting from about the level of the middle layer 6, the pipe element 1 has an inward curvature, where its outside surface passes over into the surface of the outside layer 5 without any step. There is also the possibility of structuring the tube in such a way that the outside layer 5 covers the end of the pipe element 1 (not shown) or that there are ring-shaped projections or some other relief for decorative reasons or for reinforcement present on the conical outside surface of the middle layer 6. In the neck part 8, a screw thread 11 for a screw cap, not shown, is molded into the outside layer 5.

The layers can consist of different plastic materials, especially thermoplastic materials. Among the plastics used for tube production until now, there are plastics with good barrier properties, but most of these can only be melted together with other plastics with difficulty. The plastics which can be combined easily with each other, however, usually demonstrate poorer barrier properties. For the embodiment, a practical solution is therefore to provide two inside and outside layers 3 and 5 which can be easily bonded to the plastic layers of the pipe element 1, and to arrange a middle layer consisting of a barrier material between them, which can be encapsulated on one or both ends. For example, in the case of a three-layer construction, the inside layer can consist of a polyethylene, specifically LDPE (low density polyethylene) or LLDPE (linear low density polyethylene), the middle layer can consist of a barrier layer of an ethylene vinyl alcohol copolymer (EVOH/EVAL), and the outside layer can consist of a polyethylene, specifically HDPE (high density polyethylene) or MDPE (medium density polyethylene).

If the prefinished pipe element consists of polypropylene, both the inside layer and the outside layer can also consist of polypropylene. With a two-layer construction, the outside layer can consist of LDPE or HDPE, for example, and the inside layer can consist of PETP (polyethylene terephthalate) or PBTP (polybutylene terephthalate) or another thermoplastic polyester.

If the adhesion of the individual layers to each other is not particularly strong, mechanical connections 12, for example in the form of snap fasteners, can also be provided for a reciprocal connection.

In order to produce such a tube, the cylindrical pipe element is placed on a mandrel, somewhat overlapping it, in a first step. The free end of the mandrel is structured corresponding to the inside shape of the tube head. The mandrel with the pipe element is pressed into a die, into which a heated blank of a plastic was first introduced. The die has a ring gap to hold the projecting end of the cylindrical pipe element, a central hole punch and a shape which corresponds to the desired outside surface of the inside layer 3. If necessary, projections for producing depressions for the mechanical connections 12 can also be provided. After shaping of the inside layer 3, the mandrel with the pipe element and the inside layer 3 of the tube head is brought to a second die, which has a corresponding structure and serves to produce the middle layer with the desired shape and thickness in each case.

Finally, the outside layer 5 with the thread 11 is produced in a third die. To produce the cover 8' in the area of the dispensing opening 9 in the shape shown, the hole punch of the first die for the production of the inside layer 3 has a diameter which is greater than that for the production of the outside layer 5 in the third die, but somewhat smaller than the one for the production of the middle layer 6 in the second die, where this hole punch has a truncated cone end. Because of these measures, the material of the outside layer also covers the inside of the neck part, which causes both the middle layer and the inside layer to be covered in the neck part.

I claim:

1. A method for the production of a tube from a prefinished pipe element, comprising
   pressing a heated plastic blank to form a layer of a multi-layer tube head;
   simultaneously bonding the tube head to the pipe element;
   each layer of the multi-layer tube head being formed individually by pressing of a newly introduced plastic blank in each case; and
   introducing a next blank for a subsequent layer and then pressing said next blank only after the layer previously formed is stable in shape.

2. A tube comprising
   a pipe element having an upper end and having at least one plastic pipe element layer;
   a multi-layer tube head molded on said pipe element from heated pressed plastic blanks, said tube head having a neck part opening centrally into a dispensing opening with an outside thread;
   each layer of the multi-layer tube head being made of plastic and pressed individually, layer by layer, onto the upper end of the pipe element;
   wherein the multi-layer tube head comprises an outside layer, an inside layer, and at least one middle layer located between the outside layer and the inside layer; and
   wherein at least one layer of the multi-layer tube head is a barrier layer.

3. A tube according to claim 2,
   wherein the pipe element has an inside; and
   the inside layer has a widened foot resting against the inside of the pipe element, said widened foot having a cross-sectional dimension greater than the cross-sectional dimension of the rest of the inside layer.

4. A tube according to claim 2,
   wherein said middle layer is directed at an angle of $90° \pm 20°$ towards the pipe element; and
   wherein said middle layer has an outside edge and at least said outside edge is facing the pipe element.

5. A tube according to claim 2,
   wherein said at least one middle layer is a barrier layer.

6. A tube according to claim 2,
   wherein the middle layer has an outside edge; and
   said outside edge is covered by material of the outside layer laying in the area of the dispensing opening.

7. A tube according to claim 2,
   wherein the pipe element is curved towards the inside of the tube in the area of the tube head outside layer.

8. A tube according to claim 2,
   wherein the tube head outside layer has an outside surface; and
   wherein the pipe element has an outside wall; and said outside wall passes over onto the outside surface of the tube head outside layer.

9. A tube according to claim 2,
   further comprising mechanical connections on the middle layer for connecting together the outside layer, the middle layer, and the inside layer of the multi-layer tube head.

10. A tube comprising
    a pipe element having an upper end and having at least one plastic pipe element layer, said pipe element having an inside;
    a multi-layer tube head molded on said pipe element from heated pressed plastic blanks, said tube head having a neck part opening centrally into a dispensing opening with an outside thread;
    each layer of the multi-layer tube head being made of plastic and pressed individually, layer by layer, onto the upper end of the pipe element;
    wherein the multi-layer tube head comprises an outside layer, an inside layer, and at least one middle layer located between the outside layer and the inside layer, and at least one layer of the multi-layer tube head being a barrier layer;
    said inside layer having a widened foot resting against the inside of the pipe element, said widened foot having a cross-sectional dimension greater than the cross-sectional dimension of the rest of the inside layer;

wherein said middle layer is directed at an angle of 90°±20° towards the pipe element; and wherein said middle layer has an outside edge and at least said outside edge is facing the pipe element.

* * * * *